(12) United States Patent
Simpson et al.

(10) Patent No.: US 11,326,998 B2
(45) Date of Patent: May 10, 2022

(54) SYSTEM AND METHOD FOR MONITORING A FIRE SUPPRESSION BLEND

(71) Applicant: Kidde Technologies, Inc., Wilson, NC (US)

(72) Inventors: Terry Simpson, Wake Forest, NC (US); Adam Chattaway, Old Windsor (GB)

(73) Assignee: KIDDE TECHNOLOGIES, INC., Wilson, NC (US)

( * ) Notice: Subject to any disclaimer, the term of this patent is extended or adjusted under 35 U.S.C. 154(b) by 0 days.

(21) Appl. No.: 16/388,959

(22) Filed: Apr. 19, 2019

(65) Prior Publication Data
US 2020/0333233 A1 Oct. 22, 2020

(51) Int. Cl.
*G01N 15/06* (2006.01)
*A62C 37/50* (2006.01)

(52) U.S. Cl.
CPC .......... *G01N 15/06* (2013.01); *A62C 37/50* (2013.01); *G01N 2015/0693* (2013.01)

(58) Field of Classification Search
CPC .......... G01N 15/06; G01N 2015/0693; G01N 15/0255; G01N 15/0656; G01N 15/1031; G01N 15/14; G01N 21/274; G01N 21/534; G01N 21/59; G01N 2201/08; A62C 37/50; A62C 13/76; A62C 3/004; A62C 35/02; A62C 13/003; A62C 13/006; A62C 13/62; A62C 3/06; A62C 3/065; A62C 5/006; A62D 1/0092; A62D 1/00; A62D 1/06; G01F 1/7086; G01F 1/74
See application file for complete search history.

(56) References Cited

U.S. PATENT DOCUMENTS

| | | | |
|---|---|---|---|
| 2,692,649 A | 10/1954 | McCreary | |
| 4,179,218 A * | 12/1979 | Erdmann | G01N 15/1429 250/574 |
| 4,911,129 A * | 3/1990 | Tomisawa | F02D 41/2445 123/674 |
| 5,126,570 A * | 6/1992 | Boos | F02D 19/0628 250/343 |
| 5,155,357 A * | 10/1992 | Hemond | H01J 49/0022 250/281 |
| 5,281,816 A | 1/1994 | Jacobson et al. | |
| 5,409,666 A * | 4/1995 | Nagel | A61B 5/1455 422/82.07 |
| 5,616,742 A | 4/1997 | Robin et al. | |

(Continued)

FOREIGN PATENT DOCUMENTS

| | | | | |
|---|---|---|---|---|
| CN | 104483288 B | * | 9/2017 | .......... G01N 21/359 |
| CN | 108195796 A | | 6/2018 | |

(Continued)

OTHER PUBLICATIONS

Espacenet English translation of Jingkun et al. (CN 104483288).*

(Continued)

*Primary Examiner* — Mohamed K Amara
(74) *Attorney, Agent, or Firm* — Cantor Colburn LLP

(57) ABSTRACT

Disclosed herein is a system and method for monitoring a gaseous fire suppression blend. The system includes a sensor array having a plurality of sensors disposed in a protected space, wherein the sensor array can detect and quantify more than one component of the gaseous fire suppression blend.

20 Claims, 2 Drawing Sheets

(56) References Cited

U.S. PATENT DOCUMENTS

| | | | |
|---|---|---|---|
| 5,695,688 A | 12/1997 | Nimitz et al. | |
| 6,116,348 A | 9/2000 | Drakin | |
| 6,181,426 B1 | 1/2001 | Bender et al. | |
| 6,205,841 B1* | 3/2001 | Shibamoto | G01N 21/72 356/315 |
| 6,217,788 B1* | 4/2001 | Wucherer | A62C 5/006 149/17 |
| 6,518,574 B1* | 2/2003 | Castleman | G08B 17/12 250/339.05 |
| 6,526,764 B1 | 3/2003 | Singh et al. | |
| 6,902,009 B1 | 6/2005 | Meserve et al. | |
| 7,142,105 B2* | 11/2006 | Chen | G08B 17/10 340/521 |
| 7,178,604 B2 | 2/2007 | Meserve et al. | |
| 7,339,669 B2* | 3/2008 | Matthiessen | G01N 21/3504 356/326 |
| 7,384,519 B2 | 6/2008 | Cottrell et al. | |
| 8,004,684 B2 | 8/2011 | Powell et al. | |
| 8,733,463 B2* | 5/2014 | Meier | A62C 99/0018 169/46 |
| 9,170,163 B2* | 10/2015 | Susko | G01D 11/245 |
| 9,182,331 B2 | 11/2015 | Hariram | |
| 9,207,172 B2 | 12/2015 | Seebaluck et al. | |
| 9,233,264 B2* | 1/2016 | Graham | A62C 3/08 |
| 9,298,193 B2* | 3/2016 | Susko | G01D 11/245 |
| 9,683,931 B2* | 6/2017 | Andersen | G01N 33/49 |
| 9,957,061 B2* | 5/2018 | Stehman | B64D 45/00 |
| 10,130,909 B2 | 11/2018 | Low et al. | |
| 10,493,399 B2* | 12/2019 | Low | C07C 21/18 |
| 10,561,353 B2* | 2/2020 | Lucisano | A61B 5/0031 |
| 2002/0011570 A1* | 1/2002 | Castleman | G08B 29/24 250/339.15 |
| 2002/0055175 A1* | 5/2002 | Casal | G01N 21/3504 436/55 |
| 2004/0000643 A1* | 1/2004 | Karlsson | G01N 21/3504 250/339.13 |
| 2005/0016741 A1* | 1/2005 | Paulkovich | A62C 35/58 169/5 |
| 2005/0057751 A1* | 3/2005 | Schenk | G01J 3/06 356/328 |
| 2005/0115721 A1* | 6/2005 | Blau | A62C 13/22 169/5 |
| 2005/0145820 A1 | 7/2005 | Waldrop et al. | |
| 2005/0178566 A1 | 8/2005 | Meserve et al. | |
| 2006/0132796 A1* | 6/2006 | Haran | G01N 33/346 356/503 |
| 2006/0232773 A1* | 10/2006 | Barton | G01N 21/53 356/338 |
| 2006/0243944 A1 | 11/2006 | Minor et al. | |
| 2006/0273223 A1* | 12/2006 | Haaland | A62C 3/065 244/129.2 |
| 2008/0011159 A1 | 1/2008 | Thomas et al. | |
| 2008/0032379 A1* | 2/2008 | Haugland | G01N 33/536 435/235.1 |
| 2008/0137516 A1* | 6/2008 | Hamaguchi | G11B 7/1353 369/112.07 |
| 2008/0186489 A1* | 8/2008 | Ahn | G01N 15/065 356/337 |
| 2009/0085224 A1 | 4/2009 | Choi et al. | |
| 2010/0162738 A1 | 7/2010 | Low et al. | |
| 2010/0257881 A1 | 10/2010 | Perti | |
| 2011/0073794 A1* | 3/2011 | Hagquist | A62D 1/005 252/2 |
| 2013/0240218 A1* | 9/2013 | Mitchell | A62D 1/00 169/16 |
| 2014/0048737 A1 | 2/2014 | Singh et al. | |
| 2014/0216770 A1 | 8/2014 | Gibson et al. | |
| 2014/0231660 A1 | 8/2014 | Fabre et al. | |
| 2014/0233017 A1* | 8/2014 | Hariram | G01N 15/0656 356/72 |
| 2014/0273240 A1* | 9/2014 | Georgeson | G01N 31/229 436/7 |
| 2014/0340677 A1* | 11/2014 | Sataka | G01J 3/0256 356/318 |
| 2015/0041157 A1 | 2/2015 | Mitchell et al. | |
| 2015/0328489 A1 | 11/2015 | Mondino | |
| 2015/0376546 A1 | 12/2015 | Diaz Gomez et al. | |
| 2016/0096051 A1* | 4/2016 | Baker | A62C 99/0018 169/46 |
| 2016/0296780 A1 | 10/2016 | Singh et al. | |
| 2017/0072235 A1* | 3/2017 | Ferguson | A62C 3/08 |
| 2018/0002586 A1 | 1/2018 | Low et al. | |
| 2018/0031425 A1* | 2/2018 | Nishino | G01J 5/60 |
| 2018/0201817 A1 | 7/2018 | Close et al. | |
| 2018/0217054 A1 | 8/2018 | Deguchi et al. | |
| 2018/0287698 A1* | 10/2018 | Oda | H04B 10/07953 |
| 2018/0318623 A1 | 11/2018 | Richard et al. | |
| 2019/0024126 A1* | 1/2019 | Beckham | C12N 9/1022 |
| 2019/0055442 A1 | 2/2019 | Singh et al. | |
| 2019/0083927 A1 | 3/2019 | Low et al. | |
| 2019/0085224 A1 | 3/2019 | Sethi et al. | |
| 2019/0161660 A1 | 5/2019 | Yana Motta et al. | |
| 2019/0161662 A1 | 5/2019 | Sethi et al. | |
| 2019/0161663 A1 | 5/2019 | Sethi et al. | |
| 2019/0168035 A1* | 6/2019 | Conboy | A62C 3/0292 |
| 2019/0177589 A1 | 6/2019 | Sethi et al. | |
| 2020/0205897 A1* | 7/2020 | Liu | G02B 27/106 |
| 2020/0208882 A1* | 7/2020 | Ota | C10M 129/66 |
| 2020/0330808 A1 | 10/2020 | Simpson et al. | |
| 2020/0330809 A1 | 10/2020 | Simpson | |
| 2020/0330810 A1 | 10/2020 | Simpson et al. | |
| 2020/0332192 A1 | 10/2020 | Simpson et al. | |

FOREIGN PATENT DOCUMENTS

| | | |
|---|---|---|
| GB | 2439209 A | 12/2007 |
| JP | 60139262 S | 7/1985 |
| JP | 08277389 H | 10/1996 |
| JP | 2018153463 A | 10/2018 |
| WO | 9743012 A1 | 11/1997 |
| WO | 2010001430 A2 | 1/2010 |

OTHER PUBLICATIONS

Non-Final Office Action for U.S. Appl. No. 16/413,100, filed May 15, 2019; dated Jan. 9, 2020, 19 pages.
Non-Final Office Action for U.S. Appl. No. 16/388,975, filed Apr. 19, 2019; dated Jan. 9, 2020; 24 pages.
Non-Final Office Action for U.S. Appl. No. 16/413,166, filed May 15, 2019, NFOA dated Nov. 7, 2019, 11 pages.
3M™ Novec™ Brand, 3M™ Novec™ 1230 Fire Protection Fluid, Technical Data, Jan. 2020, 12 pages.
Final Office Action for U.S. Appl. No. 16/413,166, filed May 15, 2019, FOA dated Mar. 9, 2020, 14 pages.
European Search Report for European Application No. 19212840.3; Application Filing Date: Dec. 2, 2019; dated Jul. 14, 2020, 9 pages.
European Search Report for European Application No. 19211917.0; Application Filing Date: Nov. 27, 2019; dated Jun. 23, 2020; 7 pages.
European Search Report for European Application No. 19212780.1; Date of Filing: Dec. 2, 2019; dated Jun. 24, 2020; 6 pages.
European Search Report for European Application No. 19212793.4; Application Filing Date: Dec. 2, 2019; dated Jun. 23, 2020, 7 pages.
European Search Report for European Application No. 19212814.8; Application Filing Date: Dec. 2, 2019; dated Jun. 23, 2020, 14 pages.
Final Office Action for U.S. Appl. No. 16/388,975, filed Apr. 19, 2019; dated Apr. 16, 2020; 16 pages.
Final Office Action for U.S. Appl. No. 16/413,100, filed May 15, 2019; dated Apr. 16, 2020, 17 pages.
Non-Final Office Action for U.S. Appl. No. 16/388,967, filed Apr. 19, 2019; dated Aug. 4, 2020, 42 pages.
Extended European Search Report for European Application No. 19212814.8; Application Filing Date: Dec. 2, 2020; dated Sep. 29, 2020; 12 pages.
Non-Final Office Action for U.S. Appl. No. 16/388,975, filed Apr. 19, 2019; dated Sep. 18, 2020; 31 pages.

(56) References Cited

OTHER PUBLICATIONS

Non-Final Office Action for U.S. Appl. No. 16/413,100, filed May 15, 2019; dated Sep. 17, 2020; 29 pages.
Final Rejection for U.S. Appl. No. 16/388,967, filed Apr. 19, 2019; dated Dec. 9, 2020; 20 pages.
Final Rejection for U.S. Appl. No. 16/388,975, filed Apr. 19, 2019; dated Mar. 26, 2021; 35 pages.
Final Rejection for U.S. Appl. No. 16/413,100, filed May 15, 2019; dated Mar. 29, 2021; 33 pages.
Non-Final Office Action for U.S. Appl. No. 16/413,166; filed May 15, 2019; dated May 4, 2021; 13 pages.
Notice of Allowance for U.S. Appl. No. 16/413,166, filed May 15, 2019, dated Aug. 13, 2021, 6 pages.

\* cited by examiner

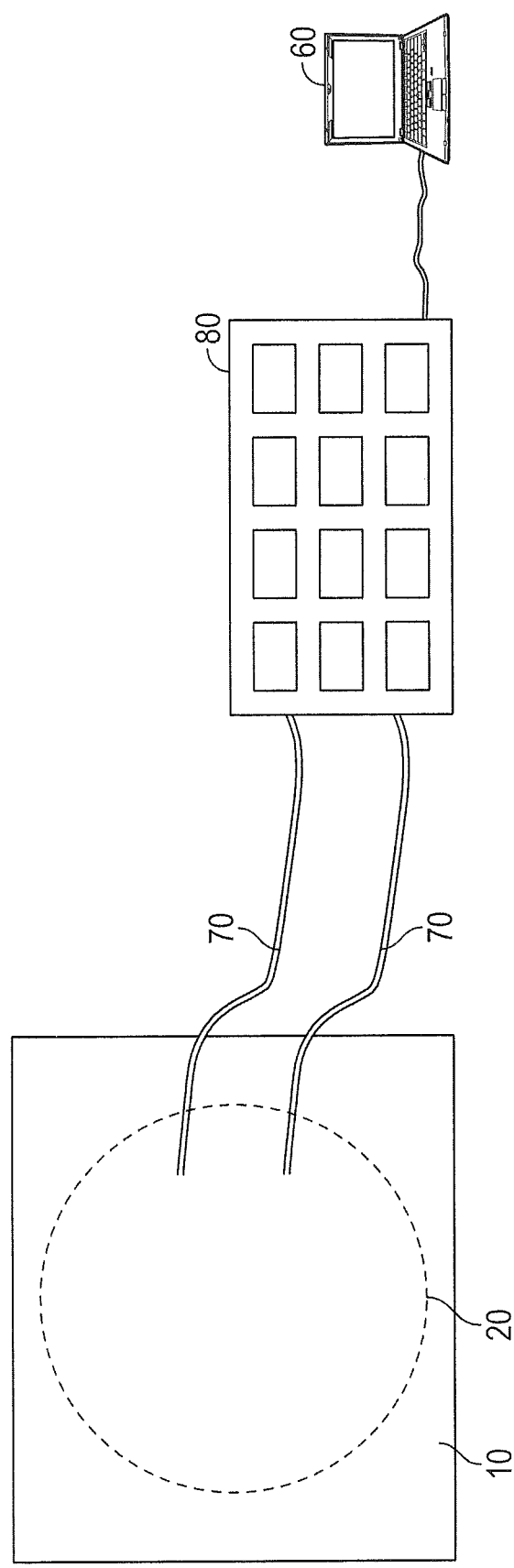

SYSTEM AND METHOD FOR MONITORING A FIRE SUPPRESSION BLEND

BACKGROUND

Exemplary embodiments pertain to the art of measuring the levels or concentration of a fire suppression agent in a protected space.

In general, existing fire suppression systems include a fire suppression agent distribution system that distributes the fire suppression agent to the aircraft engine bays and selected cargo compartments. These areas form a protected space or spaces. In a typical application, in order to effectively extinguish a fire, concentrations of a fire suppression agent must be in excess of a specified minimum concentration for a specified period of time. Lower concentrations or shorter time periods reduce effectiveness, and conversely, higher concentrations and/or longer time periods waste suppression agent. Additionally, oversizing the system can result in concentrations that have an undesired effect.

It would be desirable to have a system for monitoring the concentration of a fire suppression agent, particularly for monitoring a gaseous fire suppression blend.

BRIEF DESCRIPTION

Disclosed is a system for monitoring a gaseous fire suppression blend including a sensor array having a plurality of sensors disposed in a protected space, wherein the sensor array can detect and quantify more than one component of the gaseous fire suppression blend.

In addition to one or more of the features described above, or as an alternative to any of the foregoing embodiments, each of the plurality of sensors include one or more optical sensors that can emit and detect multiple wavelengths. In some embodiments each sensor includes a single source which can emit multiple wavelengths and the sensor includes multiple detectors that detect a single wavelength. In some embodiments each sensor includes multiple sources that emit single wavelengths and multiple detectors that detect a single wavelength. In some embodiments each sensor includes more than one source wherein each of the more than one source emits a different range of wavelengths and more than one detector which can detect a single wavelength or a range of wavelengths.

In addition to one or more of the features described above, or as an alternative to any of the foregoing embodiments, each of the plurality of optical sensors has a lower detection limit less than half of the desired minimum concentration of the gaseous fire suppression blend components.

In addition to one or more of the features described above, or as an alternative to any of the foregoing embodiments, each of the plurality of optical sensors has a lower detection limit an order of magnitude below the desired minimum concentration of the gaseous fire suppression blend components.

In addition to one or more of the features described above, or as an alternative to any of the foregoing embodiments, each of the plurality of optical sensors has an upper detection limit two times greater than a maximum allowed concentration of the gaseous fire suppression blend components.

In addition to one or more of the features described above, or as an alternative to any of the foregoing embodiments, signals from the plurality of optical sensors are processed by a central control unit.

In addition to one or more of the features described above, or as an alternative to any of the foregoing embodiments, the plurality of optical sensors are connected to the central control unit by fiber optic cable.

In addition to one or more of the features described above, or as an alternative to any of the foregoing embodiments, the plurality of sensors comprises sets of optical sensors for detecting different components of the gaseous fire suppression blend.

In addition to one or more of the features described above, or as an alternative to any of the foregoing embodiments, the plurality of sensors are disposed at different locations in the protected space.

In addition to one or more of the features described above, or as an alternative to any of the foregoing embodiments, the plurality of sensors comprise sensor tubes and a vacuum source.

In addition to one or more of the features described above, or as an alternative to any of the foregoing embodiments, the sensor tubes are in operable communication with a central analyzer.

In addition to one or more of the features described above, or as an alternative to any of the foregoing embodiments, the central analyzer can emit and detect multiple wavelengths.

Also disclosed is a method of monitoring a gaseous fire suppression blend in a protected space including measuring concentrations of more than one component of the gaseous fire suppression blend in the protected space.

In addition to one or more of the features described above, or as an alternative to any of the foregoing embodiments, the concentrations are measured over time using multiple samples.

In addition to one or more of the features described above, or as an alternative to any of the foregoing embodiments, the concentration is measured continuously over time.

In addition to one or more of the features described above, or as an alternative to any of the foregoing embodiments, each component of the gaseous fire suppression blend absorbs light at a characteristic wavelength.

In addition to one or more of the features described above, or as an alternative to any of the foregoing embodiments, light absorption of the sample at the characteristic wavelengths is compared to calibration curves to determine concentration.

In addition to one or more of the features described above, or as an alternative to any of the foregoing embodiments, measuring the concentrations employs sensors located at the different locations in the protected space.

In addition to one or more of the features described above, or as an alternative to any of the foregoing embodiments, measuring the concentrations employs a central analyzer using samples collected by sensors located at different locations in the protected space

BRIEF DESCRIPTION OF THE DRAWINGS

The following descriptions should not be considered limiting in any way. With reference to the accompanying drawings, like elements are numbered alike:

FIGS. 1 and 2 show exemplary systems for monitoring a gaseous fire suppression blend.

DETAILED DESCRIPTION

Figure 1:
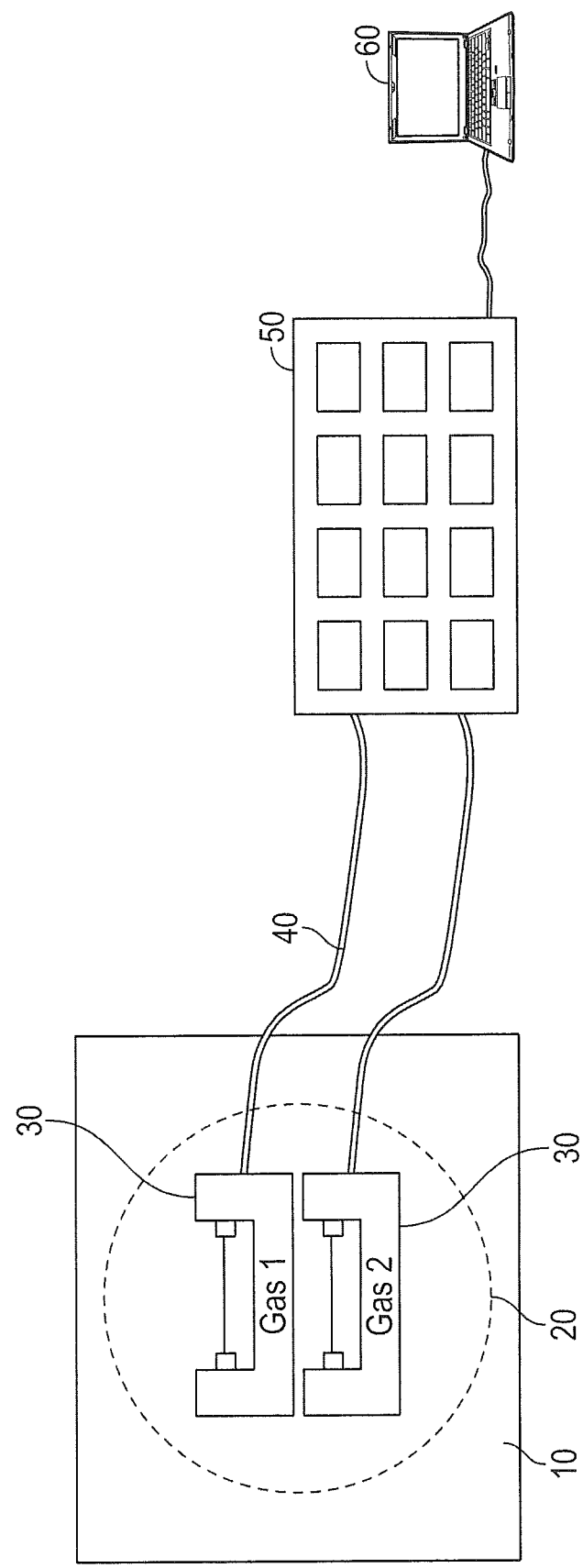

A detailed description of one or more embodiments of the disclosed apparatus and method are presented herein by way of exemplification and not limitation with reference to the Figures.

Due to concerns about ozone depletion associated with HALON 1301 there is great interest in developing the use of gaseous fire suppression blends that pose less of an ozone depletion risk. Suggested replacements for HALON 1301 include $CF_3I$ and blends including $CF_3I$ such as $CF_3I$/HFC-125, $CF_3I$/HCFO-1233zd(E), $CF_3I$/Novec 1230 and $CF_3I$/$CO_2$. Currently there is no system or method for detecting the different components of these blends simultaneously or their distribution in a protected space. Each component of the gaseous fire suppression blend may have different distribution rate in the protected space due to differences in molecular weight and other physical characteristics. Accordingly, there is currently no way to assure that the desired blend proportions are distributed throughout the volume (space) to be protected.

This need can be addressed by a system and method for monitoring the concentration of gaseous fire suppression blend components. The system and method take advantage of the fact that each component of the gaseous fire suppression blend has at least one characteristic wavelength. A characteristic wavelength is defined herein as a wavelength at which only one component of the gaseous fire suppression blend absorbs. This allows the system and method disclosed herein to use the characteristic wavelength for each component to determine the concentration of that component in the sample taken from that location at that point in time. Because the method of measurement is non-destructive the same sample can be used to determine the concentration of each component of the gaseous fire suppression blend. It is contemplated that useful wavelengths include wavelengths in the infrared, visible and ultraviolet spectrums. Exemplary components and wavelengths are shown in the table below.

| Suppression Agent | Spectral Region | Characteristic Frequency | Reason |
|---|---|---|---|
| $CF_3I$ | UV | 268 nm | C—I electronic Transition |
| Novec 1230 | UV | 307 nm | C=O electronic transition |
| HFC-125 | IR | 3000 $cm^{-1}$ | C—H stretch |
| $CO_2$ | IR | 2360 $cm^{-1}$ | C=O Stretch |
| HCFO-1233zd(E) | IR | 1680-1640 $cm^{-1}$ | C=C stretch |

The amount of absorption can be correlated to the corresponding concentration of the component using a calibration curve established using known concentrations the component to generate the curve.

Exemplary blends and the associated wavelength combinations are shown in the following table.

| Blend No. | Component 1 | Component 2 | Frequencies |
|---|---|---|---|
| 1 | $CF_3I$ | HFC-125 | 268 nm/3000 $cm^{-1}$ |
| 2 | $CF_3I$ | Novec 1230 | 268 nm/307 nm |
| 3 | $CF_3I$ | $CO_2$ | 268 nm/2360 $cm^{-1}$ |
| 4 | $CF_3I$ | HCFO-1233zd(E) | 268 nm/1680 $cm^{-1}$ |
| 5 | Novec 1230 | $CO_2$ | 307 nm/2360 $cm^{-1}$ |

The system includes a sensor array. The sensor array includes a plurality of sensors disposed in the protected space. The sensor array may include greater than or equal to 10 sensors, or, greater than or equal to 15 sensors, or, greater than or equal to 20 sensors. The sensors may distributed throughout the protected space at regular intervals or a specified locations.

The sensor may be an optical sensor which can emit and detect the desired wavelengths. The sensor may include several subunits each of which can emit and detect a single wavelength or a range of wavelengths. Alternatively, the sensor may include a multiwavelength source and a multiwavelength detector. In yet another option, the sensor may include a multiwavelength source and multiple detectors. The sensor may transmit the data to a central control unit to be compared to an appropriate calibration curve. Alternatively, the data can be compared to an appropriate calibration curve within the sensor and the results transmitted to a central unit.

The optical sensors may be connected to the central control unit using fiber optic cable. When connected by fiber optic cable the central control unit may function as the light source with the detector(s) located within the sensor. The sensor can include a single detector for multiple wavelengths, multiple detectors for single wavelengths or multiple detectors which can detect a range of wavelengths.

The optical sensor has a lower detection limit less half than the desired minimum concentration of the gaseous fire suppression blend component that it is measuring. The lower detection limit of the optical sensor may be an order of magnitude less than the desired minimum concentration of the gaseous fire suppression blend component. The optical sensor has an upper detection limit two times greater than a maximum allowed concentration of the gaseous fire suppression blend component it is measuring.

Alternatively the sensor may include a vacuum pump and sensor tubes which obtain samples and communicate the samples to a central analyzer for analysis. The central analyzer may be a spectrophotometer that employs the desired wavelengths and correlates the absorption to concentration using a calibration curve. The central analyzer has a lower detection limit less than half the desired minimum concentration of the gaseous fire suppression blend components and an upper detection limit two times greater than the maximum allowed concentration of the gaseous fire suppression blend components.

The protected space may be sampled at a single point in time, at several points in time, or over a period time. When sampled over a period of time multiple samples/data points may be obtained or the protected space may be sampled continuously.

Turning now to the Figures, FIG. 1 shows an exemplary system for monitoring a gaseous fire suppression blend. Multiple sensors 20 are located in a protected space 10. Only one sensor 20 is shown in FIG. 1 for simplicity. Each sensor includes subunits 30, each having a wavelength source and detector. Each sensor subunit is connected to a central control unit 50 by fiber optic cables 40. While FIG. 1 shows each sensor subunit individually connected, it is also contemplated that the subunits from a single sensor may be connected to the central control unit through a shared connection. The central control unit may be optionally connected to a data collection and storage device 60.

FIG. 2 shoes an exemplary system for monitoring a gaseous fire suppression blend. Multiple sensors 20 are located in a protected space 10. One sensor is shown for simplicity. The sensor 20 includes at least one tube 70 that can withdraw the sample from the protected space using a vacuum (vacuum source not shown). While FIG. 2 shows sensor 20 employing two tubes 70 it is contemplated that a single tube could suffice because the measurement method is non-destructive. The tubes 70 deliver the samples to the central analyzer 80. When there is a single tube connecting the sensor and the central analyzer the central analyzer will analyze for the components of the blend as desired. There is also the possibility of two central analyzers. The central analyzer may be optionally connected to a data collection and storage device 60.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the claims.

What is claimed is:

1. A system for monitoring a gaseous fire suppression blend comprising:
   a sensor array having a plurality of sensors disposed in a protected space, wherein the sensor array detects and quantifies a first fire suppression agent of the gaseous fire suppression blend using absorption at a first characteristic wavelength and the sensor array detects and quantifies a second fire suppression agent of the gaseous fire suppression blend using absorption at a second characteristic wavelength wherein the first characteristic wavelength is different from the second characteristic wavelength.

2. The system of claim 1, wherein each of the plurality of sensors are optical sensors that emit and detect multiple wavelengths.

3. The system of claim 2, wherein each of the plurality of optical sensors has a lower detection limit less than a desired minimum concentration of the gaseous fire suppression blend components.

4. The system of claim 2, wherein each of the plurality of optical sensors has an upper detection limit greater than a maximum allowed concentration of the gaseous fire suppression blend components.

5. The system of claim 2, wherein signals from the plurality of optical sensors are processed by a central control unit.

6. The system of claim 5, wherein the plurality of optical sensors are connected to the central control unit by fiber optic cable.

7. The system of claim 1, wherein each of the plurality of sensors comprise a single source which can emit multiple wavelengths and a single detector which can detect multiple wavelengths.

8. The system of claim 1, wherein each of the plurality of sensors comprise a single source which can emit multiple wavelengths and multiple detectors which can detect single wavelengths.

9. The system of claim 1, wherein each of the plurality of sensors comprise multiple sources which emit single wavelengths and multiple detectors which detect single wavelengths.

10. The system of claim 1, wherein the plurality of sensors are disposed at different locations in the protected space.

11. The system of claim 1, wherein the plurality of sensors comprise sensor tubes and a vacuum source.

12. The system of claim 11, wherein the sensor tubes are in operable communication with a central analyzer.

13. The system of claim 12, wherein the central analyzer comprises a central spectrophotometer that emits and detects multiple wavelengths.

14. The system of claim 1, wherein the first and second wavelengths are chosen from the group consisting of 268 nm, 307 nm, 3000 $cm^{-1}$, 2360 $cm^{-1}$, and 1680-1640 $cm^{-1}$.

15. A method of monitoring a gaseous fire suppression blend in a protected space comprising:
    measuring absorption at a first characteristic wavelength and a second characteristic wavelength using a sensor array and determining concentration of a first fire suppression agent of the gaseous fire suppression blend based on the absorption at the first characteristic wavelength and determining concentration of a second fire suppression agent of the gaseous of the fire suppression blend based on the absorption at the second characteristic wavelength.

16. The method of claim 15, wherein the concentrations of the first and second components of the gaseous fire suppression blend is measured over time using multiple samples.

17. The method of claim 15, wherein the concentrations of the first and second components of the gaseous fire suppression blend is measured continuously.

18. The method of claim 15, wherein light absorption of the sample at the characteristic wavelengths is compared to a calibration curve to determine concentration.

19. The method of claim 15, wherein measuring the concentration employs sensors located at the different locations in the protected space.

20. The method of claim 15, wherein measuring the concentration employs a central analyzer using samples collected by sensors located at different locations in the protected space.

* * * * *